United States Patent
Eikelenberg et al.

(10) Patent No.: US 8,063,755 B2
(45) Date of Patent: Nov. 22, 2011

(54) METHOD AND DEVICE FOR ASSISTING A DRIVER IN DEVELOPING A FUEL-SAVING DRIVING STYLE

(75) Inventors: Nicole Leonarda Wilhelmina Eikelenberg, Meerssen (NL); Aria Etemad, Aachen (DE); Christoph Arndt, Rheinland-Pfalz (DE); Christian Ress, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/114,501

(22) Filed: May 24, 2011

(65) Prior Publication Data

US 2011/0221586 A1    Sep. 15, 2011

(30) Foreign Application Priority Data

May 28, 2010 (DE) .......................... 10 2010 029 467

(51) Int. Cl.
*B60Q 1/00* (2006.01)
(52) U.S. Cl. ........................... 340/439; 701/29; 701/202
(58) Field of Classification Search ................ 340/439; 701/29, 200–202
See application file for complete search history.

(56) References Cited

U.S. PATENT DOCUMENTS

| 2009/0143934 A1* | 6/2009 | Motonaga et al. | 701/29 |
| 2009/0259354 A1* | 10/2009 | Krupadanam et al. | 701/22 |

\* cited by examiner

*Primary Examiner* — Thomas Mullen
(74) *Attorney, Agent, or Firm* — Jennifer M. Stec; Brooks Kushman P.C.

(57) ABSTRACT

Various embodiments relate to a method and device for assisting a driver of a motor vehicle to develop a fuel-saving driving style. A route section which permits driving at a constant speed may be determined. Further, the constant speed may be determined. An acceleration or deceleration for approaching the constant speed may be determined. The acceleration or deceleration may be displayed to the driver.

20 Claims, 3 Drawing Sheets

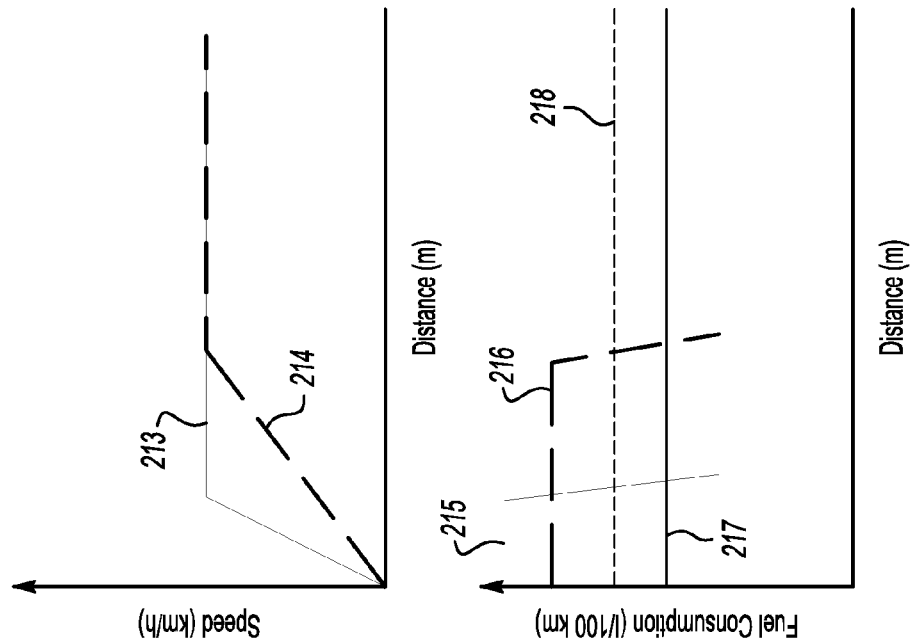
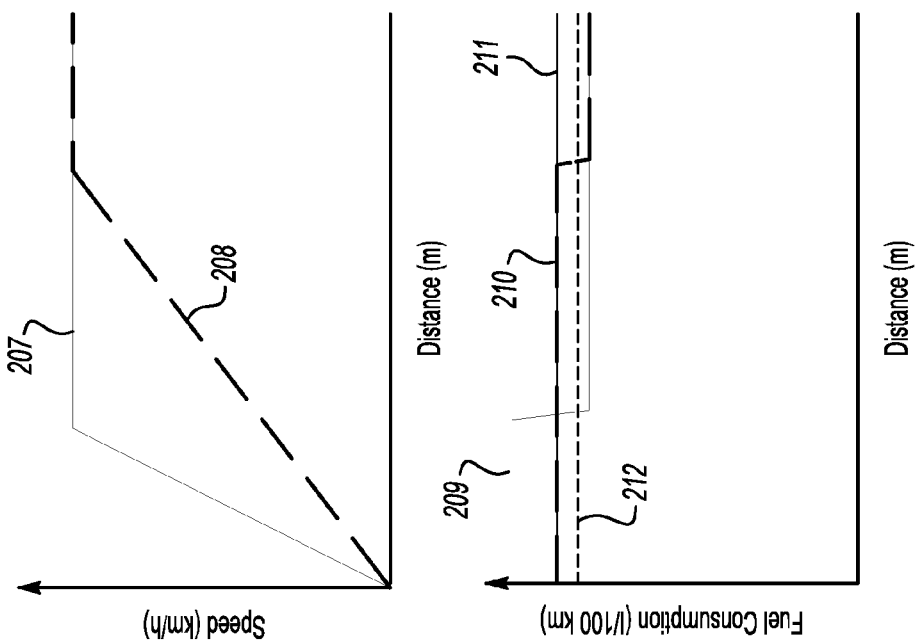
Fig-4
Fig-5

METHOD AND DEVICE FOR ASSISTING A DRIVER IN DEVELOPING A FUEL-SAVING DRIVING STYLE

CROSS-REFERENCE TO RELATED APPLICATIONS

This application claims foreign priority benefits under 35 U.S.C. §119(a)-(d) to DE 10 2010 029 467.5, filed May 28, 2010, which is hereby incorporated by reference in its entirety.

TECHNICAL FIELD

Various embodiments relate to a method and device for assisting the driver of a motor vehicle in developing a fuel-saving driving style.

BACKGROUND

The driving style of a driver is at least one variable that influences the fuel consumption of a motor vehicle. As an example, energy-saving driving may reduce fuel consumption by up to 25%.

In order to provide the driver with assistance in such a situation, WO 2009/063036 A1 discloses a motor vehicle energy saving assistance system which comprises an electronic device that is permanently installed in the motor vehicle and which exchanges data with an electronic vehicle control unit. The system includes an energy-saving algorithm, wherein the energy-saving algorithm determines the current state of the vehicle and its predicted future state in order to determine energy saving measures. The system also comprises a vehicle display device, which is actuated by the energy-saving algorithm and by which a calculated driving strategy is conveyed to the driver. This permits a predictive driving style to be assisted and the consumption of energy to be lowered.

According to DE 2008 005 328 A1, in a method for energy-efficient operation of a motor vehicle by means of a navigation system, a route from a starting location to a destination which minimizes the energy consumption of the motor vehicle is determined. In addition, during a journey with the motor vehicle, an energy-saving method of operation of the motor vehicle is determined. The energy-saving method of operation of the motor vehicle is output by an optical or acoustic message or by adjusting the transmission ratio and the accelerator pedal of the motor vehicle.

SUMMARY

In an energy saving advising system, a multiplicity of parameters may be used to minimize the energy consumption over a total route. Such systems use more data and, in the case of a longer route, for example, the complexity of the computing operations necessary increase along with the corresponding demands made of the hardware to be installed in the motor vehicle. Consequently, the time required to determine an energy-saving method of operation increases. Alternatively, corresponding inaccuracies may have to be tolerated.

In one aspect, a method for assisting the driver of a motor vehicle to develop a fuel-saving driving style utilizes a comparatively low level of computational complexity in providing a driving style which is energy-efficient. A fuel-saving driving style may be determined by identifying route sections on which it is possible to travel at a constant speed. Further, it may be determined, for each of these determined routes sections, whether acceleration and/or deceleration is optimum for the route section for travelling in an energy-efficient way. Alternatively or additionally, it may be determined which acceleration is optimum for travelling the route section to be energy efficient.

In another aspect, a device for assisting the driver of a motor vehicle in developing a fuel-saving driving style may comprise a control unit which may acquire sensor data for determining speed and/or acceleration of the motor vehicle at a current time. In addition, the control unit may be equipped for acquiring data for the predicted route section, for example, by means of an interface with a navigation system. The device may also comprise a driver interface which may comprise, in particular, an acoustic, optical and/or haptic interface. One non-limiting example of a haptic interface is provided in WO 2007/140232A2 and U.S. Pat. No. 7,603,228 (the contents of which are herein incorporated by reference).

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

FIG. 4 corresponds to the illustration in FIG. 2 for a high setpoint speed; and FIG. 5 corresponds to the illustration in FIG. 2 for a low setpoint speed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
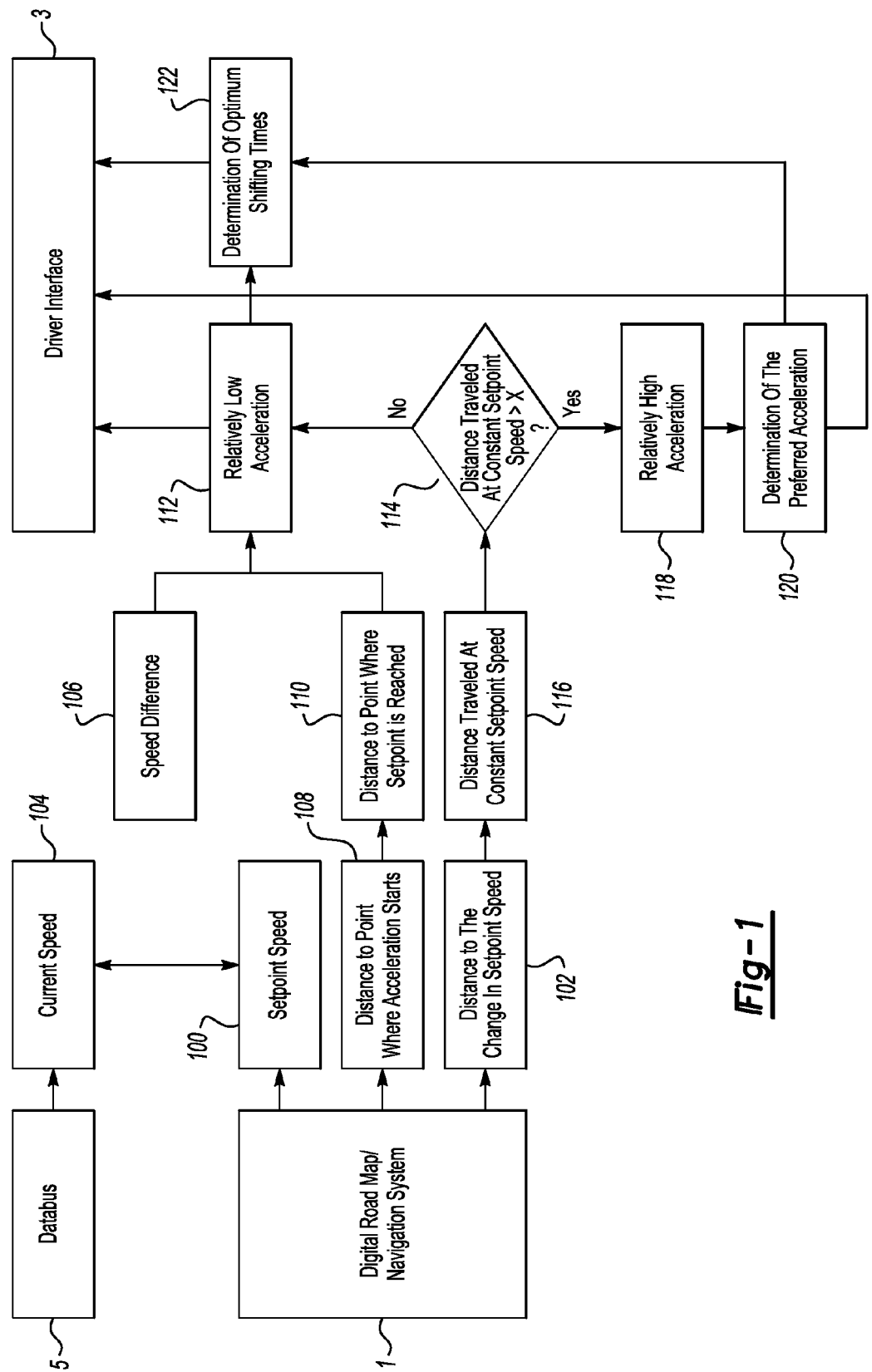
FIG. 1 shows a flowchart of an exemplary embodiment of the system and method according to the one or more embodiments of the invention.

FIG. 1 illustrates a system for recommending an energy-efficient driving style and the corresponding operation for determining an energy-efficient driving style. According to FIG. 1, a route section which is to be presently traveled through and on which it is possible to travel at a constant setpoint speed may be determined by a control unit on the basis of data from a digital road map or a navigation system 1. The setpoint speed on this route section may be also determined thereby (block 100). For this purpose, the respective current distance may be determined for a section which requires a change in the setpoint speed, such as (without limitation), a tight bend, a roundabout and/or a junction with a road which has priority (block 102). The setpoint speed can, for example, be provided by a speed limit or by the speed which may be optimum for the consumption for the respective motor vehicle. In some embodiments, additional sensor data may be used to determine the setpoint speed which can comprise, as non-limiting examples, the cargo, the cooling water temperature, and other such vehicle parameters.

A route section which permits driving at a constant setpoint speed may be determined predictively. Additionally, the constant setpoint speed may be determined. The setpoint speed may be, for example, the maximum permissible speed, for example 50 km/h within a locality and 100 km/h outside a locality or else another maximum speed which is predefined by a speed limit. While km/h is the unit of measurement used to describe and illustrate the various embodiments, other units of speed measurement may be used including, but not limited to miles per hour. Additionally, the values (e.g. 50 and 100) are merely provided as examples and, therefore are non-limiting.

The setpoint speed may be, in some embodiments, predefined by means of the requirement for maximum energy efficiency or by means of other criteria which can include, for example (and without limitation), the required travel time. A braking strategy which is connected downstream can lead to a higher or a lower setpoint speed.

The setpoint speed may be a speed at which the motor vehicle can move with the lowest route-related energy consumption. A non-limiting example of such a speed in a motor vehicle may be in the range of approximately 60 km/h. Certainly, the optimum speed, in terms of energy, may be dependent on, for example, the cargo, the topography, (e.g., and without limitation, on positive gradients and routes with negative gradients), the temperature, the air movement or on other internal or external parameters of the motor vehicle.

In order to reach the setpoint speed starting from a speed which is lower than the setpoint speed, acceleration is necessary. In the case of an energy-efficient driving style, the magnitude of the acceleration may be dependent on a length of the route section which can be traveled through at the setpoint speed. It may be possible that a different acceleration for reaching the setpoint speed will be optimum in a long route section of this type than in the case of a relatively short route section (block 114). In particular, on a relatively short route section, the setpoint speed may not always be reached with an energy-optimum driving style. Such an optimum acceleration or setpoint acceleration may be determined so that the average fuel consumption is at a minimum when the vehicle travels through the route section.

The setpoint acceleration (which is determined for an energy-efficient driving style) may be presented to the driver in order to permit implementation of the energy-efficient driving style. Such information may be presented through, for example, optical, acoustic or haptic indicator means for this purpose (e.g., interface 3). Haptic indicator means, such as those described in WO 2007/140232 A2 and U.S. Pat. No. 7,603,228 (the contents of which are hereby incorporated by reference), may be advantageous in this context. As a result, the driver is assisted in developing a fuel-saving driving style. As used herein, the terms "present," "presentation," or "presented," refer to audible and/or visual presentation.

Information from a digital road map or a navigation system 1 may be used in order to determine, in a predictive fashion, a route section which can be driven along at a constant speed. Such information from a digital road map or a navigation system 1 may comprise, for example, data about the further profile of the road currently being traveled and/or topographic data, such as (and without limitation) altitude information.

Further, in one or more embodiments, it is possible to detect, in a predictive fashion, and take into account route limitations, such as (and without limitation) bends, which cause the speed to be reduced, traffic lights and/or road priority rules, which can forcibly bring about stopping, valid speed limits and speed limits which apply over the further course of the road, and current traffic information about, for example, any traffic jams. The route information can be detected by means of a communication system through which information between motor vehicles and/or between motor vehicles and the traffic infrastructure (for example traffic lights) may be exchanged (e.g., via vehicle-to-vehicle communication and vehicle-to-infrastructure communication). Alternatively or additionally, the route limiting information may be predictively detected by means of communication with a stationary information system which makes data available with respect to the movement of individual motor vehicles. Radar sensors, LIDAR sensors or other like distance sensors can additionally or alternatively supply data about the distance from obstacles or motor vehicles traveling ahead which can be taken into account in the calculation of the route section.

According to some embodiments, at any time, the predictively determined route section, which permits driving at a constant setpoint speed, may be compared with a predetermined route in which an acceleration which is higher than the current acceleration leads to a lower average consumption on the route section (also referred to as a "baseline route"). If the route section which is determined predictively is longer than this baseline route, a setpoint acceleration may be determined which is higher than the current acceleration. This can be presented to the driver in order to improve the fuel-saving driving strategy.

This comparison may also be carried out throughout the travel and through the route section resulting in a continuously updated optimum driving style. If the length of the route section changes during travel of a route section attributed to, for example, the detection of a relatively slow vehicle traveling ahead, it may be also possible, in this context, to specify a driving strategy which is as energy-efficient as possible. The route limitation may be determined from the setpoint speed, the current acceleration and speed and, in some embodiments, further data which describes the state of the motor vehicle as determined by a predetermined dependence which may be implemented, for example, as a function, characteristic diagram or computer-assisted model.

The baseline route "X" for which a higher acceleration, starting from a current acceleration, leads to a low fuel consumption may be predetermined. The baseline route "X" can be determined by, for example, a type-dependent calibration and stored in the control unit as a function of the current speed and acceleration (obtained from a databus 5, block 104) and the setpoint speed (block 100). Of course, other parameters may be used as well. It may be determined that the route which is expected to be traveled at the setpoint speed is longer than the baseline route (block 114), for example, based on the distance traveled at a constant setpoint speed (block 116). In such a case, a relatively high acceleration may be advantageous for a fuel-saving driving style.

A relatively high fuel consumption may be compensated for, in the case of the higher acceleration, by a relatively long route which can be traveled over at constant speed attributed to the setpoint speed being reached more quickly. If the route section which is available for this is long enough, it is possible to cause the average consumption to be lowered by virtue of the fact that a higher acceleration is selected (block 118). Further, high acceleration on a longer route (block 118) may enable the setpoint speed to be reached more quickly. The vehicle, accordingly, may be driven in a fuel-saving fashion over a longer distance at a constant speed.

In some embodiments, along with determining the optimum acceleration, e.g., low acceleration or high acceleration (block 120), the respectively optimum transmission ratio and the optimum shifting times (block 122) in the case of acceleration may also be determined. The setpoint acceleration recommendation, as well as the recommended gear speed and the recommended shifting times may be conveyed to the driver via an interface 3. Such an interface 3 may be a visual and/or an acoustic interface. Additionally or alternatively, the information may be conveyed haptically, for example by influencing an accelerator pedal.

For example, if the setpoint acceleration is higher than the current acceleration, the setpoint acceleration is determined and may be presented to the driver. Furthermore, the gearspeed selection or transmission ratio which is the most favorable according to energy-efficiency criteria is advantageously determined and may also be presented to the driver. During acceleration, the shifting times which are most favorable according to energy criteria can also be displayed to the driver.

If the setpoint acceleration is not higher than the current acceleration, a relatively low acceleration recommendation, which may be optimum according to energy criteria, may be presented to the driver (block 112) via the interface 3. In this relatively low acceleration recommendation, the setpoint speed does not always have to be reached on the respective route section, in particular if the route section with a constant setpoint speed is relatively short.

The client at which the recommendation may be provided by the system may be left to driver preference. In any case, the energy-optimum acceleration may prevent a driving style which is unsuitable for the respective situation.

If the route section with a constant speed which is actually available is not longer than the predetermined baseline route "X," (block 114) a lower acceleration may be provided (block 112). For this, the setpoint speed which may be determined (block 100) may be compared with the current value of the speed (block 104) which is supplied by the databus 5 of the motor vehicle. Based on this comparison, a speed difference may be determined (block 106). The lower acceleration may be determined based on the speed difference and based on the distance still available for reaching the setpoint speed (block 110). Such a determination may also include determining a distance from a point where the acceleration starts (block 108). As a result of the lower acceleration, it may be possible to reach the setpoint speed in a fuel-saving fashion.

This is not the case where the route section is particularly short. Here, there may be increased fuel consumption as a result of a high acceleration without the possibility of compensating for this acceleration by a correspondingly long route section with a uniform speed. Nevertheless, the lower acceleration may be presented to the driver. Further, the optimum transmission ratio may be determined, and in the case of acceleration, the optimum shifting times may be determined and presented to the driver.

In some embodiments, during the determination of the setpoint acceleration, the next route section which adjoins the current route section may be taken into account in the comparison of the route section with the predetermined route. As a result it may be possible to take into account whether it is possible to drive more quickly or more slowly on the adjoining route section than on the current route section to further determine an optimized fuel-saving driving style. According to additional embodiments, it is possible to use the time which is necessary to travel through the respective route section as a further optimization criterion.

In some embodiments, the optimization criteria may be weighted and, as such, the driving style determination may be a result of a corresponding weighting. The weighted may be set by the driver. As an example of such a weighting process, it may be defined whether an energy-saving driving style is to be determined independently of a travel time or whether a fuel consumption optimization is to be based on minimization of the travel time.

Figure 2:
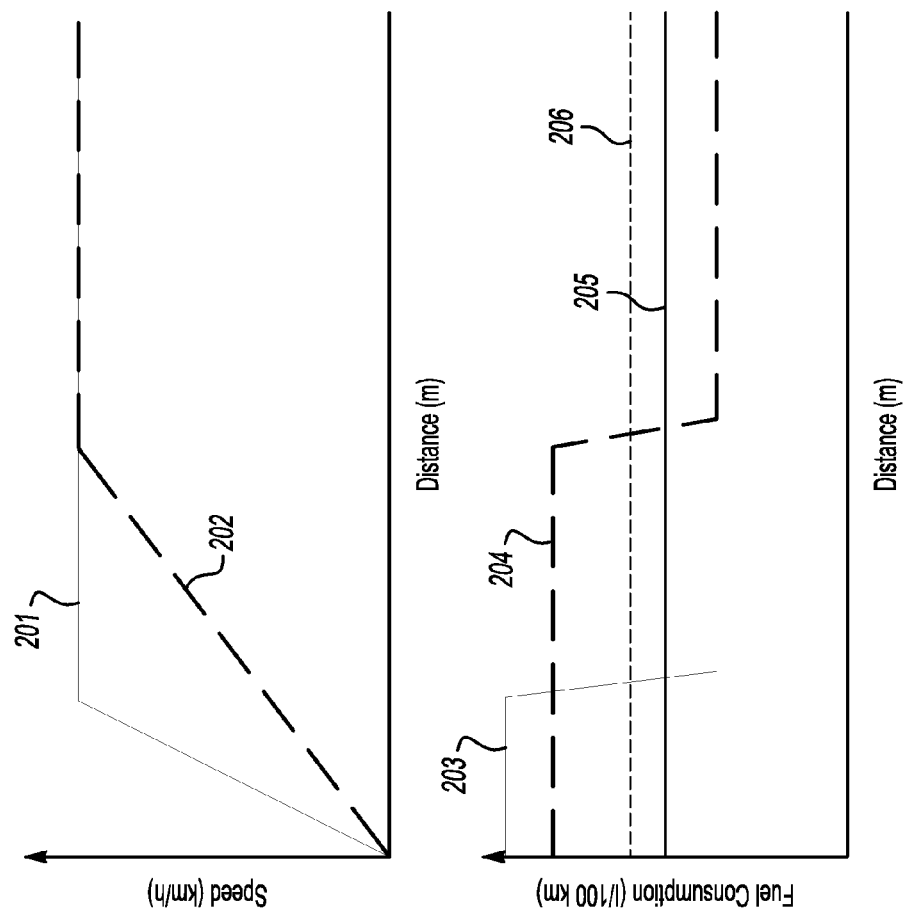
FIG. 2 shows the instantaneous speed, the instantaneous fuel consumption and the average fuel consumption as a function of the length of a route section through which it is possible to travel at a constant setpoint speed.

As is illustrated in the top part of FIG. 2, a given setpoint speed can be reached quickly by a high acceleration as represented by curve 201, e.g. after a shorter travel distance, or by a low acceleration, according to curve 202, e.g., after a longer travel distance. The instantaneous fuel consumption which is illustrated in the lower part of FIG. 2 shows that in the case of the high acceleration (curve 203) a higher fuel consumption occurs but it occurs over a shorter distance than in the case of the relatively low acceleration (curve 204). The average consumption over the entire route section for which the given setpoint speed applies may be lower when the high acceleration is used (line 205) than in the case of the low acceleration (line 206).

Figure 3:
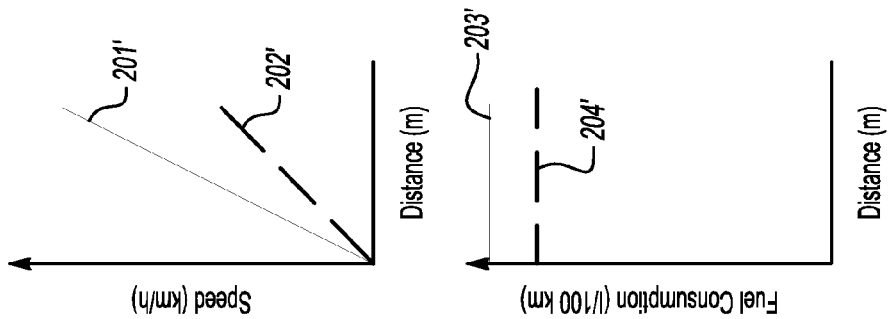
FIG. 3 shows a detail from FIG. 2 for a short route section according to one embodiment.

A detail from FIG. 2 is illustrated in FIG. 3. If the route section on which the setpoint speed can be maintained is short, in the case of high acceleration (curve 201' in the upper part of FIG. 3) the consumption (line 203' in the lower part of FIG. 3) and therefore the average consumption may be higher than when the acceleration is lower (curve 202' showing a lower acceleration and line 204' showing a lower consumption). Therefore, as is shown by FIGS. 2 and 3, a high acceleration is more economical overall in terms of fuel if a long distance is available for the setpoint speed; otherwise a low acceleration is advantageous.

Which acceleration is more economical overall in terms of fuel may also depend, according to FIGS. 4 and 5, on the speed. In the case of a high setpoint speed (for example, and without limitation 120 km/h, or other speeds, see FIG. 4), it is possible, in the case of a high acceleration (curve 207 in the top part of FIG. 4), that not only the instantaneous consumption (curve 209 in the lower part of FIG. 4) but also the average consumption (line 211) may be higher than in the case of a low acceleration (curve 208 showing low acceleration, curve 210 showing low consumption, and line 212 showing lower average consumption), even in the case of a long route section at constant setpoint speed. This is associated with the fact that, at a high speed, a constant speed also brings about relatively high fuel consumption. According to FIG. 5, at a low speed, for example at approximately (without limitation) 60 km/h or at a speed which is in the region of optimum fuel consumption, the average consumption (line 218) with a low acceleration (curve 214) and instantaneous consumption (line 216) is significantly higher than the average consumption (line 217) for a higher acceleration (curve 213) and instantaneous consumption (line 215).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for recommending a fuel-saving driving style in a vehicle, the method comprising:
   receiving input defining one or more routes at a vehicle computing system;
   receiving route profile information for the one or more routes at the vehicle computing system;
   based on the route profile information, identifying one or more portions of a route that can be travelled by a vehicle at a constant speed;
   determining the constant speed;
   determining one or more acceleration or deceleration actions to be performed by a vehicle driver for reaching the constant speed along the route to reduce energy consumption of the vehicle relative to a current speed of the vehicle; and
   presenting the one or more acceleration or deceleration actions in the vehicle.

2. The method of claim 1 further comprising:
   storing a predetermined baseline route for which a higher acceleration leads to a lower fuel consumption relative to the current speed;
   performing a comparison between the one or more identified portions of the route with the baseline route to identify a length of the identified portion; and
   based on the length of the identified portion from the comparison, determining the one or more acceleration or deceleration actions.

3. The method of claim 2 further comprising:
   identifying the one or more portions as shorter than the baseline route;
   determining a speed difference between the current speed and the constant speed;
   determining a distance to reach the constant speed; and
   based on the speed difference and the distance, determining the acceleration or deceleration action to reach the constant speed along the shorter portion.

4. The method of claim 1 wherein the acceleration or deceleration actions are presented via at least one of a visual client, audible client, or haptic client.

5. The method of claim 4 wherein the client is based on driver preference.

6. The method of claim 1 further comprising:
   receiving a travel time for travelling the route; and
   determining the one or more acceleration or deceleration actions based on the travel time.

7. The method of claim 1 further comprising:
   receiving a length of the one or more identified portions of the route; and
   determining the one or more acceleration or deceleration actions based on the length of the one or more identified portions of the route.

8. A system for recommending a fuel-saving driving style in a vehicle, the system comprising:
   at least one vehicle computing system configured to:
      receive input defining one or more routes;
      receive route profile information for the one or more routes;
      based on the route profile information, identify one or more portions of the route that can be travelled by a vehicle at a constant speed;
      determine the constant speed;
      determine one or more acceleration or deceleration actions to be performed by a vehicle driver for reaching the constant speed along the route to enable efficient energy consumption of the vehicle relative to a current speed of the vehicle; and
      present the one or more acceleration or deceleration actions in the vehicle.

9. The system of claim 8 wherein the at least one vehicle computing system is further configured to determine one or more gear speeds based on the acceleration action.

10. The system of claim 9 wherein the at least one vehicle computing system is further configured to determine one or more gear shifting times.

11. The system of claim 8 wherein the route is a route adjoining a route currently being travelled.

12. The system of claim 8 wherein the at least one vehicle computing system is further configured to:
   receiving route limitation information which disrupts the constant speed; and
   determining the acceleration or deceleration action based on the limitation information.

13. The system of claim 12 wherein the route limitation information includes at least one of traffic flow, traffic lights, bends, and route priority rules.

14. The system of claim 8 wherein the route profile information includes altitude information.

15. The system of claim 8 wherein the at least one vehicle computing system is further configured to:
   store a predetermined baseline route for which a higher acceleration leads to a lower fuel consumption based on a current acceleration;
   perform a comparison between the one or more identified portions of the route with the baseline route to identify a length of the identified portion; and
   determine the one or more acceleration or deceleration actions based on the length of the identified portion from the comparison.

16. The system of claim 15 wherein the at least one vehicle computing system is further configured to determine a higher acceleration if the route section is longer than the predetermined route.

17. The system of claim 15 wherein the at least one vehicle computing system is further configured to determine a lower acceleration if the route section is shorter than the predetermined route.

18. An apparatus comprising at least one vehicle computing system configured to:
   receive input defining a route;
   receive route profile information for the route;
   identify route portions that a vehicle can travel at a constant speed based on the route profile information;
   determine the constant speed;
   determine acceleration or deceleration actions for reaching the constant speed enabling efficient energy consumption by the vehicle relative to the constant speed; and
   present the acceleration/deceleration actions.

19. The apparatus of claim 18 further configured to
   store a predetermined baseline route for which a higher acceleration leads to a lower fuel consumption based on a current acceleration;
   perform a comparison between the one or more identified portions of the route with the baseline route to identify a length of the identified portion; and
   determine the one or more acceleration or deceleration actions based on the length of the identified portion from the comparison.

20. The apparatus of claim 19 further configured to determine a higher acceleration if the route section is longer than the predetermined route.

* * * * *